(12) United States Patent
MacNair, Jr. et al.

(10) Patent No.: US 7,830,118 B2
(45) Date of Patent: Nov. 9, 2010

(54) BATTERY RECOVERY SYSTEM

(75) Inventors: Douglas G. MacNair, Jr., Georgetown, TX (US); John Barbian, Leander, TX (US); Jay L. Taylor, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 12/492,647

(22) Filed: Jun. 26, 2009

(65) Prior Publication Data

US 2009/0261784 A1 Oct. 22, 2009

Related U.S. Application Data

(63) Continuation of application No. 11/103,998, filed on Apr. 12, 2005, now Pat. No. 7,570,019, and a continuation of application No. 10/435,920, filed on May 12, 2003, now abandoned.

(51) Int. Cl.
*H02J 7/00* (2006.01)
(52) U.S. Cl. ........................ 320/128; 320/137
(58) Field of Classification Search ................ 320/112, 320/114, 128, 137, 131, 138
See application file for complete search history.

(56) References Cited

U.S. PATENT DOCUMENTS 5,568,039 A 10/1996 Fernandez
5,818,200 A 10/1998 Cummings et al.
6,144,186 A * 11/2000 Thandiwe et al. ............ 320/134
6,262,562 B1 7/2001 Cummings et al.
7,039,150 B1 * 5/2006 Drori ........................ 375/377
2003/0117112 A1 * 6/2003 Chen et al. .................. 320/137
2003/0169019 A1 * 9/2003 Oosaki ....................... 320/132
2003/0231002 A1 * 12/2003 Johnson ...................... 320/112

* cited by examiner

*Primary Examiner*—Bao Q Vu
*Assistant Examiner*—Nguyen Tran
(74) *Attorney, Agent, or Firm*—Haynes and Boone, LLP

(57) ABSTRACT

A battery includes at least one rechargeable battery cell that is operable to store energy. An electronics unit is coupled to the at least one rechargeable battery cell, wherein the electronics unit is operable to control an operating condition of the battery, and wherein the electronics unit is inoperable when the energy stored in the at least one rechargeable battery cell is insufficient to operate the electronics unit. A detector component is coupled to the electronics unit and operable to determine that the electronics unit is inoperable. A charge discharge component is coupled to the at least one rechargeable battery cell, wherein in response to the electronics unit being operable, the charge discharge component is operable to provide a charge to the at least one rechargeable battery cell through a first charge path. A trickle charge component is coupled to the detector component and the at least one rechargeable battery cell, wherein in response to the detector component determining that the electronics unit is inoperable, the trickle charge component is operable to provide a charge to the at least one rechargeable battery cell, through a second charge path that bypasses the electronics unit, that is sufficient to charge the at least one rechargeable battery cell such that the electronics unit becomes operable.

20 Claims, 5 Drawing Sheets

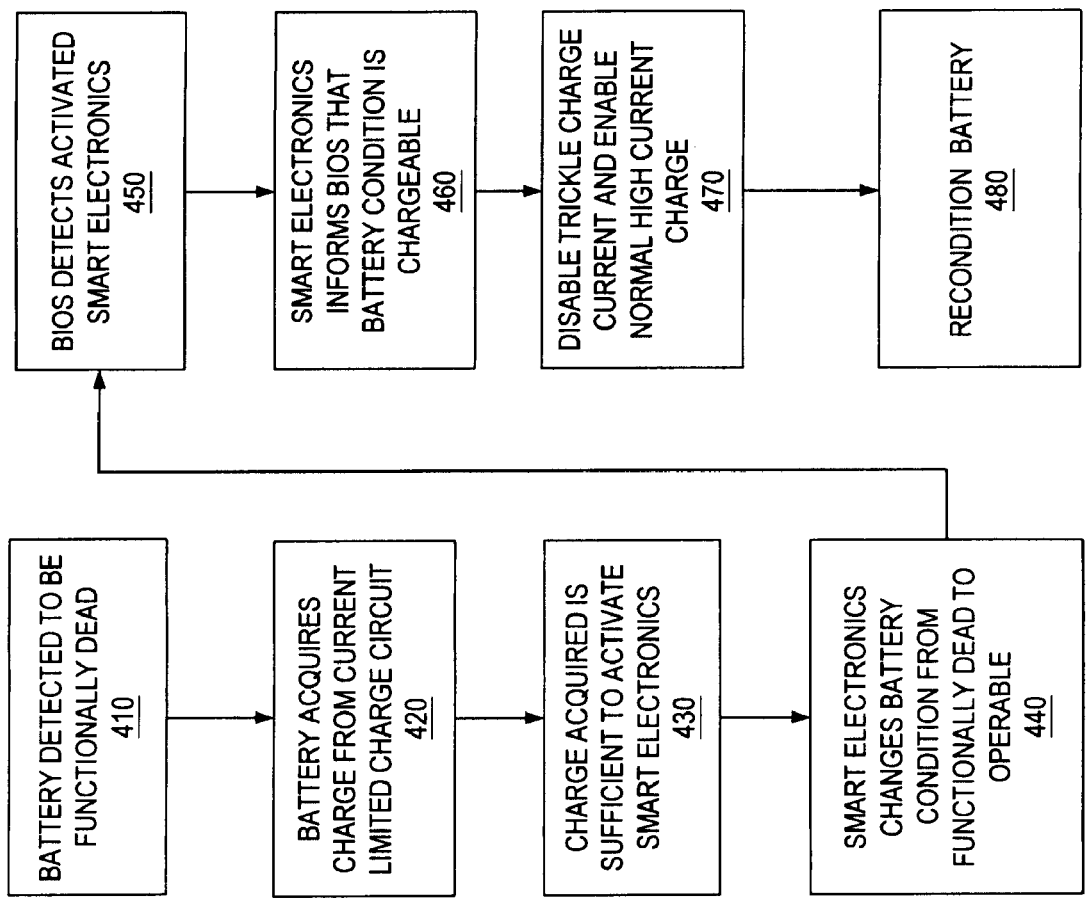

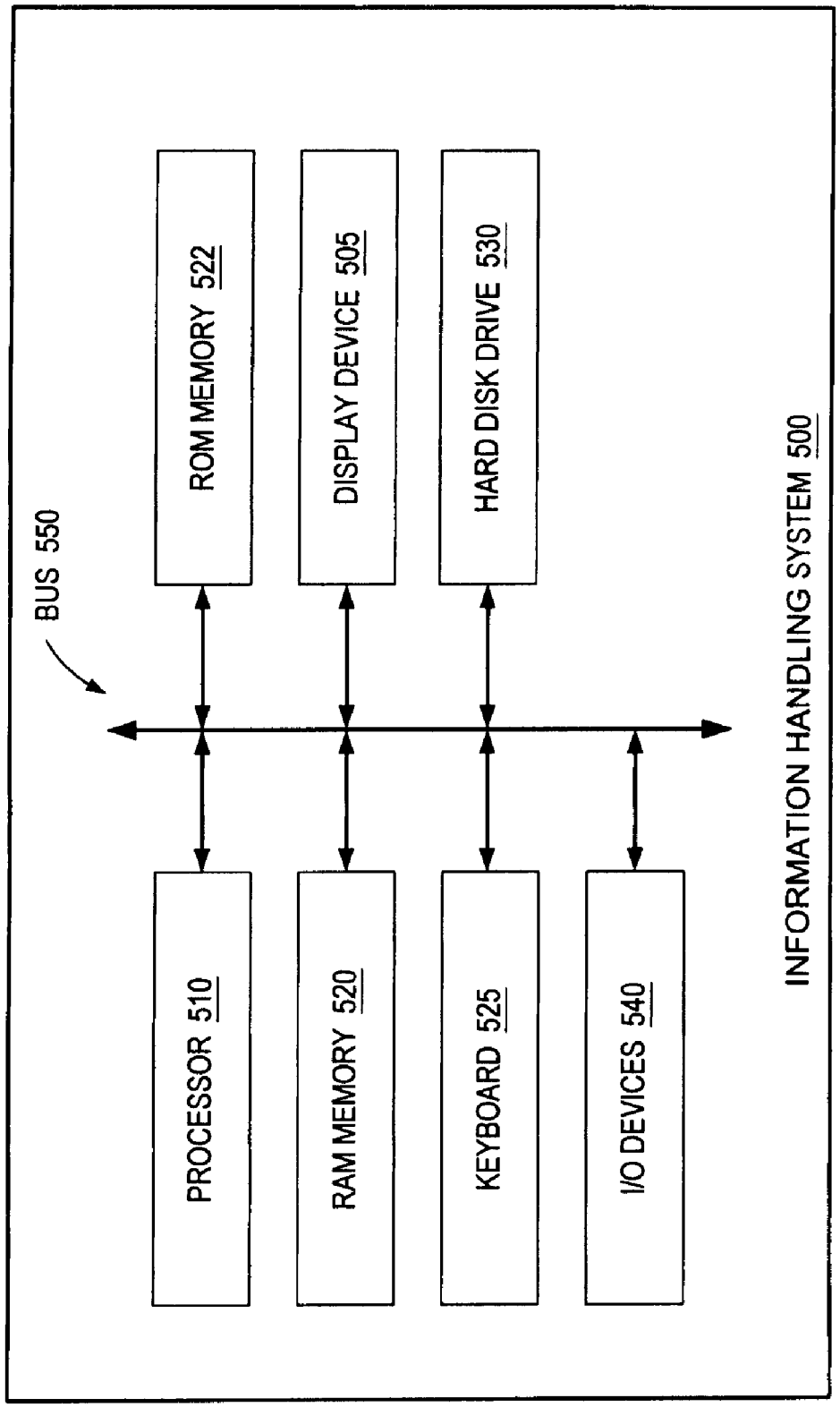

BATTERY RECOVERY SYSTEM

CROSS REFERENCE TO RELATED APPLICATIONS

The present application is a Continuation of U.S. Utility application Ser. No. 11/103,998, filed on Apr. 12, 2005, which is a continuation of U.S. Utility application Ser. No. 10/435,920, filed on May 12, 2003, the disclosures of which are incorporated herein by reference.

BACKGROUND

The present disclosure relates generally to information handling systems, and more particularly to recovering rechargeable batteries used to provide energy to information handling system components such as, for example, notebook computers, personal digital assistants, cellular phones and gaming consoles.

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A battery converts chemical energy within its material constituents into electrical energy in the process of discharging. A rechargeable battery is generally returned to its original charged state (or substantially close to it) by passing an electrical current in the opposite direction to that of the discharge. Presently, well known rechargeable battery technologies include Lithium Ion (LiON), Nickel Cadmium (NiCd), and Nickel Metal Hydride (NiMH). In the past, the rechargeable batteries provided an unpredictable source of power for the portable devices, because typically, a user of the device powered by the battery had no reliable advance warning that the energy supplied by the rechargeable battery was about to run out.

Today, through the development of more sophisticated battery packs, batteries have become a more reliable source of power by providing information to the IHS and eventually to a user as to the state of charge, as well as a wealth of other information. These batteries are typically equipped with electronic circuitry to monitor and control the operation of the battery. The following U.S. patents are incorporated herein by reference: Dual Smart Battery Detection System And Method For Portable Computers (U.S. Pat. No. 5,818,200), Increased Battery Capacity Utilizing Multiple Smart Batteries (U.S. Pat. No. 6,262,562), and Apparatus And Method Of Providing An Initiation Voltage To A Rechargeable Battery System (U.S. Pat. No. 5,568,039).

It is well known that batteries may monitor internal charge levels and typically shut down the load coupled to them when they can no longer provide the minimum power required to operate the load. Upon discharge, the user typically restores the charge level of the battery during a recharge process. On occasion, however, the batteries may be discharged to the point of not having enough charge to keep "smart" technology built into the battery in an operational condition. When such a condition occurs, the batteries are typically described as being functionally dead. For example, it is common practice to store batteries for later use, e.g., as spare inventory. By simply storing the battery on a shelf for several months the battery continues to discharge and eventually becomes functionally dead. The user if often surprised to find out that a new battery that was stored on the shelf for an extended period of time is not operable. The user typically discards the dead battery in accordance with proper recycling procedures or sends it to the manufacturer for a new replacement.

Therefore, a need exists to provide for recovering a battery which is functionally dead. Accordingly, it would be desirable to provide for recovering rechargeable batteries included in an IHS.

SUMMARY

In an embodiment, a battery includes at least one rechargeable battery cell that is operable to store energy, an electronics unit that is coupled to the at least one rechargeable battery cell, wherein the electronics unit is operable to control an operating condition of the battery, and wherein the electronics unit is inoperable when the energy stored in the at least one rechargeable battery cell is insufficient to operate the electronics unit, a detector component coupled to the electronics unit and operable to determine that the electronics unit is inoperable, a charge discharge component coupled to the at least one rechargeable battery cell, wherein in response to the electronics unit being operable, the charge discharge component is operable to provide a charge to the at least one rechargeable battery cell through a first charge path, and a trickle charge component coupled to the detector component and the at least one rechargeable battery cell, wherein in response to the detector component determining that the electronics unit is inoperable, the trickle charge component is operable to provide a charge to the at least one rechargeable battery cell, through a second charge path that bypasses the electronics unit, that is sufficient to charge the at least one rechargeable battery cell such that the electronics unit becomes operable.

BRIEF DESCRIPTION OF THE DRAWINGS

FIG. 4 is a flow chart illustrating a method for recovering and reconditioning a smart battery, according to an embodiment.

FIG. 5 illustrates a block diagram of an IHS to implement method or apparatus aspects of the present disclosure, according to an embodiment.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various components described herein may be implemented as hardware (including circuits) and/or software, depending on the application requirements.

A smart battery may become functionally dead if it is discharged below a certain threshold level. The cost to replace a functionally dead battery is typically the same as purchasing a new smart battery. There is a need to for a cost effective and environmentally friendly mechanism for recovery and reuse of functionally dead batteries. According to one embodiment, in a method for recovering and reconditioning a smart battery, a functionally dead condition of the battery is detected. The battery includes a smart electronics unit. The smart electronics unit is operable for controlling an operating condition of the battery. In the functionally dead condition of the battery, the smart electronics becomes inoperable. While in this condition, a current limited trickle charge is provided to the battery such that the path of the trickle charge bypasses the inoperable smart electronics. Upon the battery receiving a sufficient amount of charge, the smart electronics regains control for controlling the operating condition of the battery. The smart electronics reconditions the battery by recharging it to a fully charged state.

Figure 1:
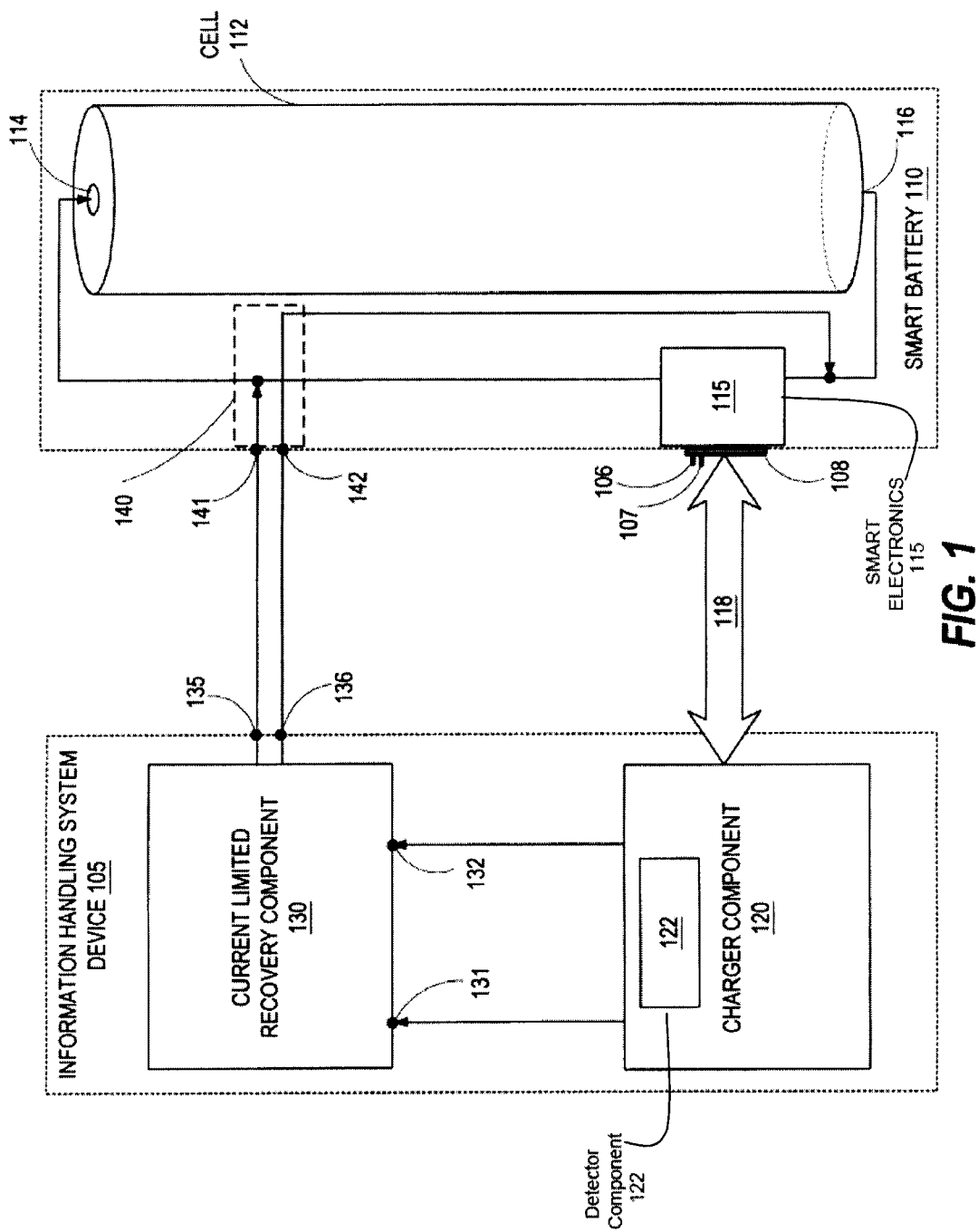
FIG. 1 illustrates a diagrammatic representation of a system for recovering and reconditioning a smart battery, according to an embodiment.

FIG. 1 illustrates a diagrammatic representation of a system for recovering and reconditioning a smart battery, according to an embodiment. The system for recovering and reconditioning a smart battery includes a smart battery 110 for storing energy, a charger component 120 included in a portable IHS device 105 for providing a charge to the smart battery 110 and a current limited recovery component 130 for providing the charge to the smart battery 110 during the recovery and reconditioning process.

The smart battery 110 includes at least one rechargeable cell 112 having a positive terminal 114 and a negative terminal 116. Other cells may be present but are not shown. The terminals 114 and 116 are coupled to a smart electronics unit 115. The smart electronics 115 includes battery charge and control lines 118 for interfacing with external devices such as the charger component 120 via a connector 108. For example, the battery charge and control lines 118 may include a Systems Monitor Bus (SM Bus) (not shown), which is widely used in the industry. The battery charge and control lines 118 may also include a positive terminal 106 and negative terminal 107 for receiving or sending the charge. The smart electronics 115 controls the operating condition of the smart battery 110. More specifically, the smart electronics 115 monitors the energy level of the rechargeable cell 112. When requested, the smart electronics 115 is operable to provide energy stored in the rechargeable cell 112 to the charger component 120 during a discharge operating condition. The smart electronics 115 notifies the charger 120 when the energy level falls below a predefined threshold level. During a charge operating condition, the smart electronics 115 is operable to receive a charge from the charger component 120 and transfer the charge to the rechargeable cell 112 when required.

The energy stored in the rechargeable cell 112 is used to provide power to the smart electronics 115. During a normally discharged operating condition of the smart battery 110, there is sufficient power available within the rechargeable cell 112 to continue to provide power to the smart electronics 115 but not to the load, e.g., portable IHS device 105 via the charger component 120. The smart electronics 115 remains operable to control the operating condition of the smart battery during the normally discharged condition. However, during the functionally dead condition (also referred to as a deep discharged or critically discharged condition) of the smart battery 110, the rechargeable cell 112 is unable to provide sufficient power to the smart electronics 115 for it to remain operable. Thus in a functionally dead condition the smart electronics 115 is unable to detect the presence of the rechargeable cell 112 even though the smart electronics 115 is coupled to the terminals 114 and 116. The smart electronics 115 being inoperable it is unable to send or receive signals using the battery charge and control lines 118.

A bypass component 140 is included in the smart battery 110. The bypass component 140 is operable, in response to detecting the functionally dead condition of the battery 110, to bypass the smart electronics 115 and provide a direct conductive path to the terminals 114 and 116. In one embodiment, another pair of terminals, i.e., positive terminal 141 and negative terminal 142 are coupled to the corresponding terminals 114 and 116 by the direct conductive path provided by a wire or a cable. Thus, a charge applied to terminals 141 and 142 is directly transferred to terminals 114 and 116 of the rechargeable cell 112, thereby completely bypassing the inoperable smart electronics 115. In one embodiment, the terminals 141 and 142 of the bypass component 140 may be incorporated into the connector 108 for connecting the charge and control lines 118 but still provide an independent conductive path to the terminals 114 and 116.

A detector component 122 included in the charger component 120 is operable to detect whether the smart electronics 115 is operable. For example, the detector component 122 monitors signal activity on the charge and control lines 118 to detect the operating condition of the smart electronics 115, and hence of the smart battery 110. In one embodiment, the detector component 122 functions are implemented by a Basic Input Output System (BIOS) program (not shown). The BIOS program is defined for the device 105 to detect the operating condition of the battery 110, e.g., detecting the functionally dead condition. In one embodiment, the detector component 122 is configured to be executed periodically and/or on demand.

A current limited recovery component 130 is operable to provide a charge to the smart battery 110 during the recovery and reconditioning process. In one embodiment, the current limited recovery component 130 is included in the charger component 120. In one embodiment, the recovery component 130 is implemented external to the charger component 120. When the detector component 122 included in the charger component 120 detects the battery 110 to be functionally dead, it sends a message to the recovery component 130 to provide the charge to the battery 110 using the bypass component 140. The recovery component 130 includes a pair of input terminals 131 and 132 for receiving inputs from the charger component 120, and a pair of output terminals 135 and 136 for connecting to the corresponding terminals 141 and 142 of the bypass component 140. When instructed, the recovery component 130 generates the charge and transfers the charge to the bypass component 140 via terminals 141 and 142. An amount of charge delivered to the battery 110 is predefined by controlling a time interval for the charge. Additional details of the recovery component 130 are described in FIG. 2.

If the battery 110 is faulty and/or defective, the battery 110 will be non-responsive to the charge provided by the recovery component 130 during the recovery and reconditioning process. That is, if the battery is faulty and/or defective, the rechargeable cell 112 will not be able to store energy that would be sufficient to activate the smart electronics 115. In such a case, the smart electronics 115 will continue to be inoperable. Thus, if the smart electronics 115 continues to be inoperable after the recovery component 130 delivers a sufficient amount of charge for the predefined time interval then the battery 115 operating condition is changed from being functionally dead to a non-recoverable dead condition.

Figure 2:
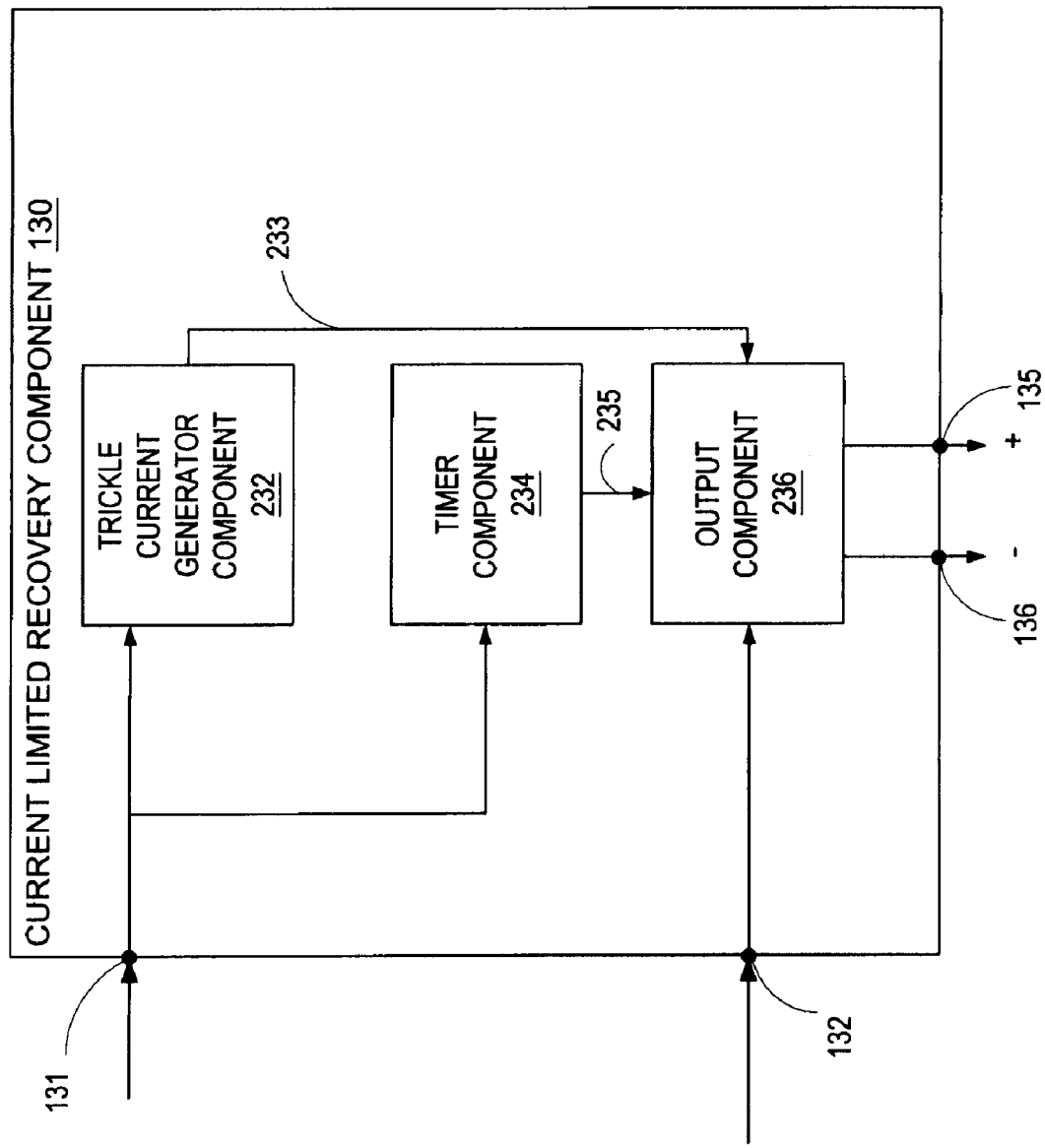
FIG. 2 illustrates more details of current limited charger device illustrated in FIG. 1, according to an embodiment.

FIG. 2 illustrates additional details of the current limited recovery component 130 illustrated in FIG. 1, according to an embodiment. The recovery component includes a trickle current generator component 232 to generate a current limited trickle charge, a timer component 234 to keep track of a predefined time interval, and an output component 236 to provide the charge to the battery 110 via the terminals 141 and 142 of the bypass component 140.

A current limited trickle charge mechanism is preferred compared to a rapid charge mechanism because a possibility exists that the battery 110 may be functionally dead due to a fault condition. For example, the fault condition may be due to the presence of a short in the rechargeable cell 112 and/or the smart electronics 115. Use of a rapid charge mechanism may result in damaging the recovery component 130 when a faulty condition exists. The use of a current limited trickle charge mechanism advantageously limits the charge current to a predefined value. Thus, potential damage caused to the recovery component 130 or other charging component is minimized during the presence of faulty conditions in the battery 110. Additional safety components (not shown) may be incorporated in the recovery component 130 to detect the presence of faulty conditions and disable the output component 236.

As described earlier, the recovery component 130 includes a pair of input terminals 131 and 132 for receiving inputs from the charger component 120, and a pair of output terminals 135 and 136 for connecting to the corresponding terminals 141 and 142 of the bypass component 140. In one embodiment, only one terminal 131 may be used for transferring messages. Upon receiving an indication from the charger component 120 via the terminals 131 and 132, the trickle current generator component 232 is operable to generate the current limited trickle charge. An output 233 of the trickle current generator component 232 is provided as an input to the output component 236. The indication in the form of a message or instruction received from the charger component 120 is also provided as an input to the timer component 234. The predefined value of the time interval varies depending on the type of the battery 110. In one embodiment, for a predefined battery type a predefined value of the time interval is passed as a parameter in the message or instruction received. An output 235 of the timer component 234 is provided as another input to the output component 236. The output component 236 provides the current limited trickle charge for the predefined time interval to the bypass component 140 via terminals 141 and 142.

Figure 3:
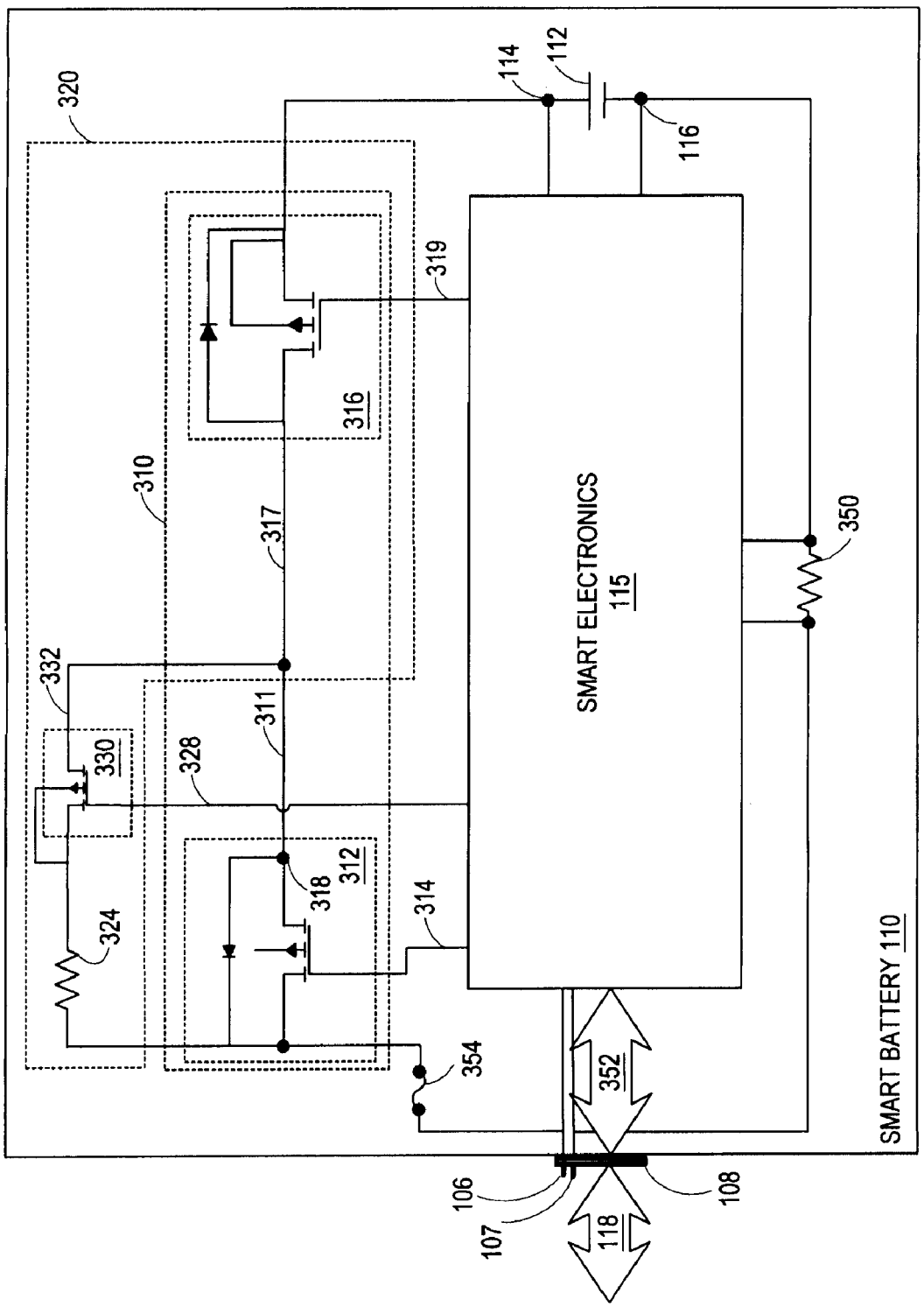
FIG. 3 illustrates another diagrammatic representation of a system for recovering and reconditioning a smart battery, according to an embodiment.

FIG. 3 illustrates another diagrammatic representation of a system for recovering and reconditioning a smart battery, according to an embodiment. In this embodiment, the mechanism to trickle charge the battery 110 while the battery is in the functionally dead condition is included in the battery 110.

In this embodiment, the battery 110 includes the at least one rechargeable battery cell 112 operable to store energy. Other cells may be present but are not shown. Battery charge and control lines 118 are coupled to the battery 110 via the connector 108. As described earlier, in one embodiment, terminals 106 and 107 are included in the connector 108. The battery 110 also includes the smart electronics 115, a charge discharge component 310 operable to provide a first conductive path between the terminals 106 and 107 of the connector 108 and the rechargeable cell 112, and a trickle charge component 320 operable to provide a second conductive path between the terminals 106 and 107 of the connector 108 and the rechargeable cell 112, while the smart electronics 115 is inoperable. The smart electronics 115 measures the current flowing through the battery 110 by measuring a voltage across a current sensor resistor 350. The smart electronics 115 communicates with other devices such as device 105 using an SMBus 352 connected via connector 108. Also shown is a fuse 354 to protect the battery from over current conditions.

The smart electronics 115 is coupled to the at least one cell 112 and the pair of terminals 106 and 107. As described earlier, the smart electronics 115 is inoperable when the energy stored in the cell 112 is insufficient to operate the smart electronics 115. Thus, the smart electronics 115 is inoperable when the battery 110 is in the functionally dead condition. When operable, the smart electronics monitors and controls the various operating conditions of the battery 110, such as charging, discharging, ready for charging, ready for discharging, and faulty. For example, when the energy level of the rechargeable cell 112 falls below a threshold level the smart electronics informs the charger component 120 that the battery 110 operating condition is chargeable, i.e., the battery 110 is operable to accept a charge from the charger component 120.

The charge discharge component 310 is coupled to the smart electronics 115, the terminals 106 and 107 and the cell 112. The charge discharge component 310 is operable to provide the first conductive path between the pair of terminals and the cell 112 in response to the smart electronics 115 being operable. The first conductive path is thus the normal high current path during normal high current charging and/or discharging operating condition of the battery 110.

In one embodiment, the charge discharge component 310 includes a first switching device 312 coupled to one of the terminals 106 and 107. The first switching device 312 is operable, responsive to a first control signal 314 received from the smart electronics 115, to selectively switch on a first portion 311 of the first conductive path to the cell 112 from the one of the terminals 106 and 107.

The charge discharge component 310 also includes a second switching device 316 coupled to an output 318 of the first switching device 312 and the cell 112. The second switching device 316 is responsive to a second control signal 319 received from the smart electronics 115 to selectively switch on a second portion 317 of the first conductive path.

In one embodiment, the first and second switching devices 312 and 316 are implemented using MOSFET body diodes. The MOSFET body diodes are advantageously used to minimize the impact of an accidental reverse connection of the battery 110 or other over-current causing conditions.

The trickle charge component 320 is operable to provide the second conductive path between the terminals 106 and 107 and the cell 112 in response to the smart electronics 115 being inoperable. The second conductive path is thus the normal limited current path during recovery of the battery 110 while the battery is in a functionally dead operating condition. The functionality provided by the trickle charge component 320 is, in many aspects, similar to that of the current limited recovery component 130.

The trickle charge component 320 includes a trickle charge resistor 324 connected in series with a third switching device 330. The combination of the resistor 324 and the third switching device 330 is in parallel to the first switching device 312. The trickle charge resistor 324 is coupled to one of the terminals 106 and 107. The third switching device 330 is coupled to the resistor 324, and an input of the second switching device 316, which is the same as the output 318 of the first switching device 312. The third switching device 330 is responsive to a third control signal 328 received from the smart electronics 115 just prior to a shutdown condition of the smart electronics 115, to selectively switch on a first portion 332 of the second conductive path when the smart electronics 115 becomes inoperable. A second portion of the second conductive path includes the second portion 317 of the first conductive path. Thus, upon the smart electronics 115 being inoperable, the third switching device 330 and the second switching device enter a 'latch closed' state to enable the second conductive path.

FIG. 4 is a flow chart illustrating a method for recovering and reconditioning a smart battery, according to an embodiment. In step 410, the battery 110 is detected to be in a functionally dead operating condition. In step 420, the battery 110, more specifically the cell 112, acquires a charge from the recovery component 130 described in FIGS. 1 and 2 or the trickle charge component 320 described in FIG. 3. In step 430, the charge acquired by the cell 112 is sufficient to activate the smart electronics 115. Thus, upon receiving the sufficient charge the smart electronics 115 is operable.

In step 440, in response to the smart electronics 115 being operable, the smart electronics 115 changes the operating condition of the battery 110 from being functionally dead to operable. In step 450, the detector component 122 of the charger component 120 detects that the smart electronics 115 is operable. As described earlier, in one embodiment, a BIOS program executing in the device 105 may implement the detector component 122. In step 460, the smart electronics 115 informs the BIOS program that the battery 110 operating condition is chargeable. That is, the battery 110 is operable to receive a charge.

In step 470, the trickle charge path is disabled and the normal high current charge path is enabled. For example, the BIOS program included in the charger component 120 shuts off the alternate trickle charge current provided by the recovery component 130 described in FIGS. 2 and 3. In step 480, the battery 110 is reconditioned under the control of the smart electronics 115 by charging the cell 112 to a fully charged operating condition. Various steps described above may be added, omitted, combined, altered, or performed in different orders.

FIG. 5 illustrates a block diagram of an IHS to implement method or apparatus aspects of the present disclosure, according to an embodiment. For purposes of this disclosure, an IHS 500 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS 500 may be a personal computer, a network storage device, or any other suitable device and may vary in size, shape, performance, functionality, and price.

The IHS 500 may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Referring to FIG. 5, the IHS 500 includes a processor 510, a system random access memory (RAM) 520, a system ROM 522, a display device 505, a keyboard 525 and various other I/O devices 540. It should be understood that the term "information handling system" is intended to encompass any device having a processor that executes instructions from a memory medium. The IHS 500 is shown to include a hard disk drive 530 connected to the processor 510 although some embodiments may not include the hard disk drive 530. The processor 510 communicates with the system components via a bus 550, which includes data, address and control lines. A communications device (not shown) may also be connected to the bus 550 to enable information exchange between the system 500 and other devices.

In one embodiment, the IHS 500 may be used to implement the portable IHS device 105 described in FIG. 1. The battery 110 (not shown) may be configured to provide power to the IHS 500.

The processor 510 is operable to execute the computing instructions and/or operations of the IHS 500. The memory medium, e.g., RAM 520, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC). For example, in one embodiment, the BIOS program described in FIG. 2 may be implemented using an assembler language code.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A battery, comprising:
    at least one rechargeable battery cell that is operable to store energy;
    an electronics unit that is coupled to the at least one rechargeable battery cell, wherein the electronics unit is operable to control an operating condition of the battery, and wherein the electronics unit is inoperable when the energy stored in the at least one rechargeable battery cell is insufficient to operate the electronics unit;
    a detector component coupled to the electronics unit and operable to determine that the electronics unit is inoperable;
    a charge discharge component coupled to the at least one rechargeable battery cell, wherein in response to the electronics unit being operable, the charge discharge component is operable to provide a charge to the at least one rechargeable battery cell through a first charge path; and
    a trickle charge component coupled to the detector component and the at least one rechargeable battery cell, wherein in response to the detector component determining that the electronics unit is inoperable, the trickle charge component is operable to provide a charge to the at least one rechargeable battery cell, through a second charge path that bypasses the electronics unit, that is sufficient to charge the at least one rechargeable battery cell such that the electronics unit becomes operable.

2. The battery of claim 1, wherein the charge discharge component further comprises:
   a first switching device that is coupled to the at least one rechargeable battery cell and is operable, in response to a first control signal received from the electronics unit, to selectively switch on a first portion of the first charge path to the at least one rechargeable battery cell; and
   a second switching device that is coupled to an output of the first switching device and the at least one rechargeable battery cell, wherein the second switching device is operable, in response to a second control signal received from the electronics unit, to selectively switch on a second portion of the first charge path.

3. The battery of claim 2, wherein the second switching device is operable to switch on the second portion of the first charge path in response to the electronics unit being inoperable.

4. The battery of claim 2, wherein the trickle charge component further comprises:
   a resistor device coupled to the at least one rechargeable battery cell; and
   a third switching device that is coupled to the resistor device and an input of the second switching device, wherein the third switching device is operable, in response to a third control signal received from the electronics unit, to selectively switch on a first portion of the second charge path in response to the electronics unit being inoperable.

5. The battery of claim 2, wherein a second portion of the second charge path includes the second portion of the first charge path.

6. A battery recovery system, comprising:
   a device;
   a battery that is operable to provide power to the device and that includes an electronics unit that is operable to control an operating condition of the battery;
   a detector component that is coupled to the electronics unit and operable to determine that the electronics unit is inoperable;
   a first charging component coupled to the detector component and the battery, wherein in response to the detector component determining that the electronics unit is inoperable, the first charge component is operable to provide a charge to the battery, through a first charge path that bypasses the electronics unit, that is sufficient to charge the battery such that the electronics unit becomes operable; and
   a second charging component coupled to the battery, wherein in response to the electronics unit being operable, the second charging component is operable to provide a charge to the battery through a second charge path.

7. The system of claim 6, wherein the first charging component further comprises:
   a bypass component that is coupled to detector component and the battery, wherein the bypass component is operable for bypassing the electronics unit, in response to the detector component determining that the electronics unit is inoperable, and providing a first charge path to the battery;
   a recovery component coupled to the battery, the detector component, and the bypass component, wherein the recovery component is operable to provide the charge to the battery through the first charge path provided by the bypass component in response the detector component determining that the electronics unit is inoperable.

8. The system of claim 7, wherein the recovery component further comprises:
   a trickle current generator component that is operable to generate the charge, wherein the charge comprises a current limited trickle charge;
   a timer component that is operable to keep track of a predefined time interval; and
   an output component that is operable to provide the charge to the battery through the bypass component.

9. The system of claim 6, wherein the device comprises an information handling system.

10. The system of claim 6, wherein the information handling system further comprises:
    a processor;
    a system bus; and
    a memory coupled to the processor through the system bus.

11. A method for recovering a battery, the method comprising:
    providing a battery that provides power to an electronics unit that is operable to control an operating condition of the battery;
    determining that the electronics unit is inoperable;
    in response to determining that the electronics unit is inoperable, providing a charge to the battery through a first charge path that bypasses the electronics unit, wherein the charge provided to the battery is sufficient to charge the battery such that the electronics unit becomes operable;
    detecting that the electronics unit has become operable; and
    in response to detecting that the electronics unit has become operable, providing a charge to the battery through a second charge path.

12. The method of claim 11, wherein the charge provided through the first charge path comprises a trickle charge that is provided for a predefined time interval.

13. The method of claim 12, wherein the charge provided that is sufficient to charge the battery such that the electronics unit becomes operable is provided during the predetermined time interval.

14. The method of claim 11, wherein the electronics unit includes at least one battery charge and control line that interfaces with at least one external device.

15. The method of claim 11, comprising:
    identifying the battery to be in a non-recoverable dead condition when the electronics unit continues to be to be inoperable upon providing the charge that is sufficient to charge the battery such that the electronics unit becomes operable.

16. The method of claim 11, wherein the detecting that the electronics unit has become operable comprises:
    activating the electronics unit in response to the battery receiving the charge that is sufficient to charge the battery such that the electronics unit becomes operable, the activation of the electronics unit causing the electronics unit to change from being inoperable to being operable;
    changing the operating condition of the battery from a dead condition to an operable condition in response to the electronics unit being operable;
    at least one component to which the battery provides power detecting the electronics unit being operable; and the at least one component disabling the first charge path and transferring charge control to the electronics unit in response to detecting the electronics unit being operable.

17. The method of claim 11, wherein the charge through the first charge path is a trickle charge, wherein the trickle charge is current limited.

18. The method of claim 11, wherein the electronics unit being inoperable prevents the battery from receiving a charge through the second charge path.

19. The method of claim 11, wherein the electronics unit is operable to recondition the battery by charging the battery to a fully charged condition.

20. The method of claim 11, wherein the determining that the electronics unit is inoperable is performed by a basic input output system program coupled to at least one component to which the battery provides power.

* * * * *